(12) United States Patent
Zhang et al.

(10) Patent No.: US 12,050,622 B2
(45) Date of Patent: *Jul. 30, 2024

(54) REPLICATING BIG DATA

(71) Applicant: Google LLC, Mountain View, CA (US)

(72) Inventors: Wangyuan Zhang, Fremont, CA (US); Li Moore, Mountain View, CA (US)

(73) Assignee: Google LLC, Mountain View, CA (US)

( * ) Notice: Subject to any disclaimer, the term of this patent is extended or adjusted under 35 U.S.C. 154(b) by 807 days.

This patent is subject to a terminal disclaimer.

(21) Appl. No.: 16/858,619

(22) Filed: Apr. 25, 2020

(65) Prior Publication Data

US 2020/0265068 A1 Aug. 20, 2020

Related U.S. Application Data

(63) Continuation of application No. 14/813,181, filed on Jul. 30, 2015, now Pat. No. 10,650,024.

(51) Int. Cl.
| | |
|---|---|
| *G06F 16/30* | (2019.01) |
| *G06F 16/13* | (2019.01) |
| *G06F 16/174* | (2019.01) |
| *G06F 16/182* | (2019.01) |
| *G06F 16/27* | (2019.01) |
| *G06F 16/25* | (2019.01) |

(52) U.S. Cl.
CPC .......... *G06F 16/275* (2019.01); *G06F 16/134* (2019.01); *G06F 16/1748* (2019.01); *G06F 16/182* (2019.01); *G06F 16/27* (2019.01); *G06F 16/25* (2019.01)

(58) Field of Classification Search
CPC ...... G06F 16/275; G06F 16/27; G06F 16/182; G06F 16/134; G06F 16/25
See application file for complete search history.

(56) References Cited

U.S. PATENT DOCUMENTS

| | | | |
|---|---|---|---|
| 8,683,112 B2 | 3/2014 | Drobychev et al. | |
| 2004/0098425 A1* | 5/2004 | Wiss | .............. G06F 11/2071 |
| 2006/0059173 A1 | 3/2006 | Hirsch et al. | |

(Continued)

FOREIGN PATENT DOCUMENTS

WO 2010048595 A2 4/2010

*Primary Examiner* — Khanh B Pham
(74) *Attorney, Agent, or Firm* — Honigman LLP; Brett A. Krueger

(57) ABSTRACT

A method includes identifying a first table including data. The first table has associated metadata, an associated replication state, an associated replication log file including replication logs logging mutations of the first table, and an associated replication configuration file including a first association that associates the first table with a replication family. The method includes inserting a second association in the replication configuration file that associates a second table having a non-loadable state with the replication family. The association of the second table with the replication family causes persistence of any replication logs in the replication log file that correspond to any mutations of the first table during the existence of the second table. The method further includes generating a third table from the first table, the metadata associated with the first table, and the associated replication state of the first table.

20 Claims, 12 Drawing Sheets

(56) References Cited

U.S. PATENT DOCUMENTS

| | | | |
|---|---|---|---|
| 2012/0023066 A1* | 1/2012 | Bourbonnais | G06F 16/256 |
| | | | 707/613 |
| 2013/0124470 A1 | 5/2013 | Kesselman et al. | |
| 2013/0198139 A1* | 8/2013 | Skidanov | G06F 11/1471 |
| | | | 707/649 |
| 2014/0365527 A1 | 12/2014 | Fuchs et al. | |
| 2017/0293532 A1* | 10/2017 | Prahlad | G06F 11/1446 |
| 2019/0236081 A1* | 8/2019 | Park | G06F 16/951 |

* cited by examiner

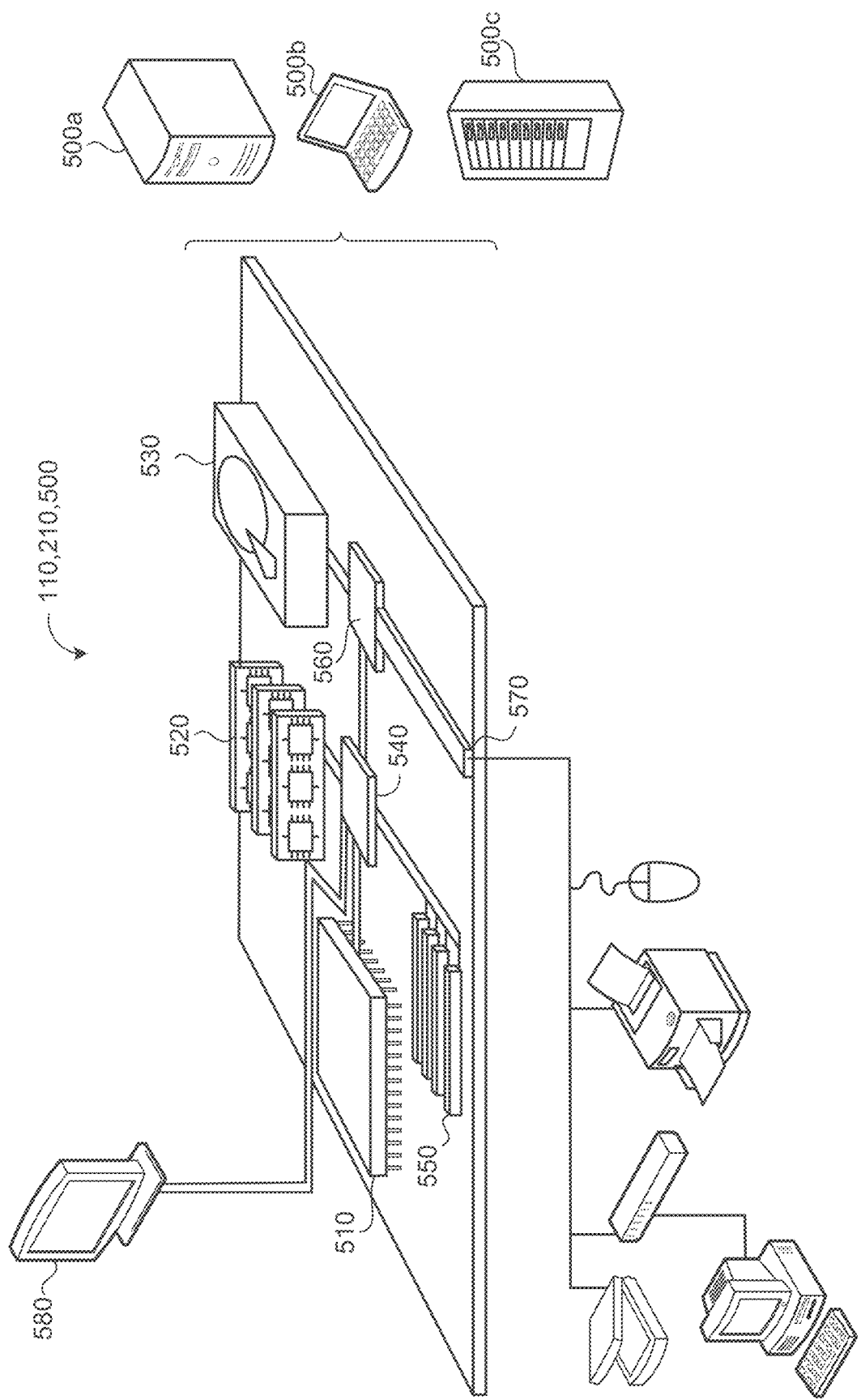

REPLICATING BIG DATA

CROSS REFERENCE TO RELATED APPLICATIONS

This U.S. patent application is a continuation of, and claims priority under 35 U.S.C. § 120 from, U.S. patent application Ser. No. 14/813,181, filed on Jul. 30, 2015. The disclosure of this prior application is considered part of the disclosure of this application and is hereby incorporated by reference in its entirety.

TECHNICAL FIELD

This disclosure relates to efficiently replicating big data.

BACKGROUND

A distributed system generally includes many loosely coupled computers, each of which typically includes a computing resource (e.g., one or more processors) and/or storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers.

The distributed storage system may store "Big Data," which is a term generally used for a collection of data sets that are so large and complex that on-hand database management tools or traditional data processing applications have a hard time processing (e.g., capturing, storing, searching, transferring, analyzing, visualizing, information privacy, etc.). Big data size is constantly expanding, ranging from a few dozen terabytes to many petabytes (1 PB=$10^{15}$ bytes=$10^3$ terabytes) of data.

Big data may be characterized by what is often referred to as the five V's: volume, variety, velocity, value, and veracity. Volume relates to the quantity of data, which determines whether the data may actually be considered Big Data. Variety refers to the categories that Big Data belongs to, which are known by data analysts allowing them to analyze the data. Velocity relates to the speed of generating the data or how fast the data is generated and processed to meet the demands and the challenges of the growth and development of data. Variability refers to the inconsistency of the data, which ultimately affect the efficiency of handling the data. Finally, veracity refers to the accuracy of the data source leading to the accuracy of the analysis of the data.

SUMMARY

One aspect of the disclosure provides a method for efficient data replication. The method includes identifying, by data processing hardware, a first table. The first table includes data and has associated metadata defining the first table. In addition, the first table has an associated replication state, an associated replication log file including replication logs logging mutations of the first table, and an associated replication configuration file. The associated replication configuration file includes a first association that associates the first table with a replication family. The method also includes inserting, by the data processing hardware, a second association in the replication configuration file that associates a second table having a non-loadable state with the replication family. The association of the second table with the replication family causes persistence of any replication logs in the replication log file that correspond to any mutations of the first table during the existence of the second table. The method further includes generating, by the data processing hardware, a third table from the first table, the metadata associated with the first table, and the associated replication state of the first table. The method includes inserting, by the data processing hardware, a third association in the replication configuration file that associates the third table with the replication family. The method further includes applying, by the data processing hardware, to the third table the mutations of the first table from any replication logs logged in the replication log file during the existence of the second table.

Implementations of the disclosure may include one or more of the following optional features. In some implementations, the method includes removing, by the data processing hardware, the second association from the replication configuration file. The removal of the second association removes the persistence of any replication logs in the replication log file that correspond to any mutations of the first table during the existence of the second table. The method further includes generating, by the data processing hardware, the second table with the non-loadable state before inserting the second association in the replication configuration file and deleting, by the data processing hardware, the second table after removing the second association from the replication configuration file.

In some examples, applying to the third table the mutations of the first table of any replication logs logged in the replication log file during the existence of the second table includes, before removing the second association from the replication configuration file, identifying, as transient mutations, any mutations to the first table logged in the associated replication log file that occurred after generating the second table and inserting the second association in the replication configuration file and before a completion of generating the third table. Applying to the third table the mutations of the first table of any replication logs further includes applying the transient mutations to the third table. The replication configuration file may include replication logs for mutations to all tables associated with the replication family. The method may further include applying, by the data processing hardware, to the third table the mutations of replication logs logged for each table in the replication log file during the existence of the second table. The associated replication state of the first table may include a logical clock indicating a most recent time when all mutations of a source table were applied to the first table, the first table being a replication of the source table.

Additionally or alternatively, generating the third table may include copying a sorted string table file representing the first table, copying a metadata file including the metadata associated with the first table, copying a replication state file including the first table replication state and storing in memory hardware in communication with the data processing hardware, the copied sorted string table, the copied metadata file, and the copied replication state file. The sorted string table may include a map from keys to values of the first database table. The keys and values may be arbitrary byte strings. The keys may represent a row and a column. The value represents data stored in a cell defined by the row and the column. The non-loadable state of the second table may prevent loading data into the second table and processing replication logs of any tables associated with the replication family in the replication configuration file.

Another aspect of the disclosure provides a system for efficient data replication. The system includes data processing hardware and memory hardware in communication with the data processing hardware. The memory hardware stores instructions, that when executed on the data processing hardware, cause the data processing hardware to perform operations. The operations include identifying a first table including data and inserting a second association in the replication configuration file that associates a second table having a non-loadable state with the replication family. The first table has associated metadata defining the first table, an associated replication state, an associated replication log file including replication logs logging mutations of the first table, and an associated replication configuration file including a first association that associates the first table with a replication family. The association of the second table with the replication family causes persistence of any replication logs in the replication log file that correspond to any mutations of the first table during the existence of the second table. The operations further include generating a third table from the first table, the metadata associated with the first table, and the associated replication state of the first table. The operations also include inserting a third association in the replication configuration file that associates the third table with the replication family and applying to the third table the mutations of the first table from any replication logs logged in the replication log file during the existence of the second table.

This aspect may include one or more of the following optional features. The operations may include removing the second association from the replication configuration file, the removal of the second association removing the persistence of any replication logs in the replication log file that correspond to any mutations of the first table during the existence of the second table. The operations may further include generating the second table with the non-loadable state before inserting the second association in the replication configuration file and deleting the second table after removing the second association from the replication configuration file. Applying to the third table the mutations of the first table of any replication logs logged in the replication log file during the existence of the second table includes, before removing the second association from the replication configuration file, identifying, as transient mutations, any mutations to the first table logged in the associated replication log file that occurred after generating the second table and inserting the second association in the replication configuration file and before a completion of generating the third table. The system may further include applying the transient mutations to the third table. The replication configuration may include replication logs for mutations to all tables associated with the replication family.

In some examples, the operations further include applying to the third table the mutations of replication logs logged for each table in the replication log file during the existence of the second table. The associated replication state of the first table may include a logical clock indicating a most recent time when all mutations of a source table were applied to the first table, the first table being a replication of the source table. Additionally or alternatively, generating the third table may include copying a sorted string table file representing the first table, copying a metadata file including the metadata associated with the first table and copying a replication state file including the first table replication state. Generating the third table may also include storing in memory hardware in communication with the data processing hardware, the copied sorted string table file, the copied metadata file, and the copied replication state file. The sorted string table may include a map from keys to values of the first database table, the keys and values being arbitrary byte strings, the keys representing a row and a column, and the value representing data stored in a cell defined by the row and the column. The non-loadable state of the second table may prevent loading data into the second table and processing replication logs of any tables associated with the replication family in the replication configuration file.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is a schematic view of an example computing device executing any systems or methods described herein.

Like reference symbols in the various drawings indicate like elements.

DETAILED DESCRIPTION

A distributed storage system for managing structured data may be designed to scale to a very large size, e.g., petabytes of data across thousands of commodity servers. The distributed storage system supports applications that require processing very large size data. The distributed storage system may resemble a database, in the sense that it shares many implementation strategies with databases. For example, parallel databases and main-memory databases have achieved scalability and high performance, however, the distributed storage system provides a different interface than such database systems. The distributed storage system provides its clients with a data model that supports dynamic control over data layout and format. In addition, the distributed storage system allows the clients to reason about the locality properties of the data represented in the underlying storage. The distributed storage system may index the stored data using row and column names that may be arbitrary strings. The distributed storage system may be a sparse, distributed, persistent multi-dimensional sorted map. The map may be indexed or identified by a row key, a column key, and a timestamp, where each value in the map is an uninterpreted array of bytes.

Figure 1A:
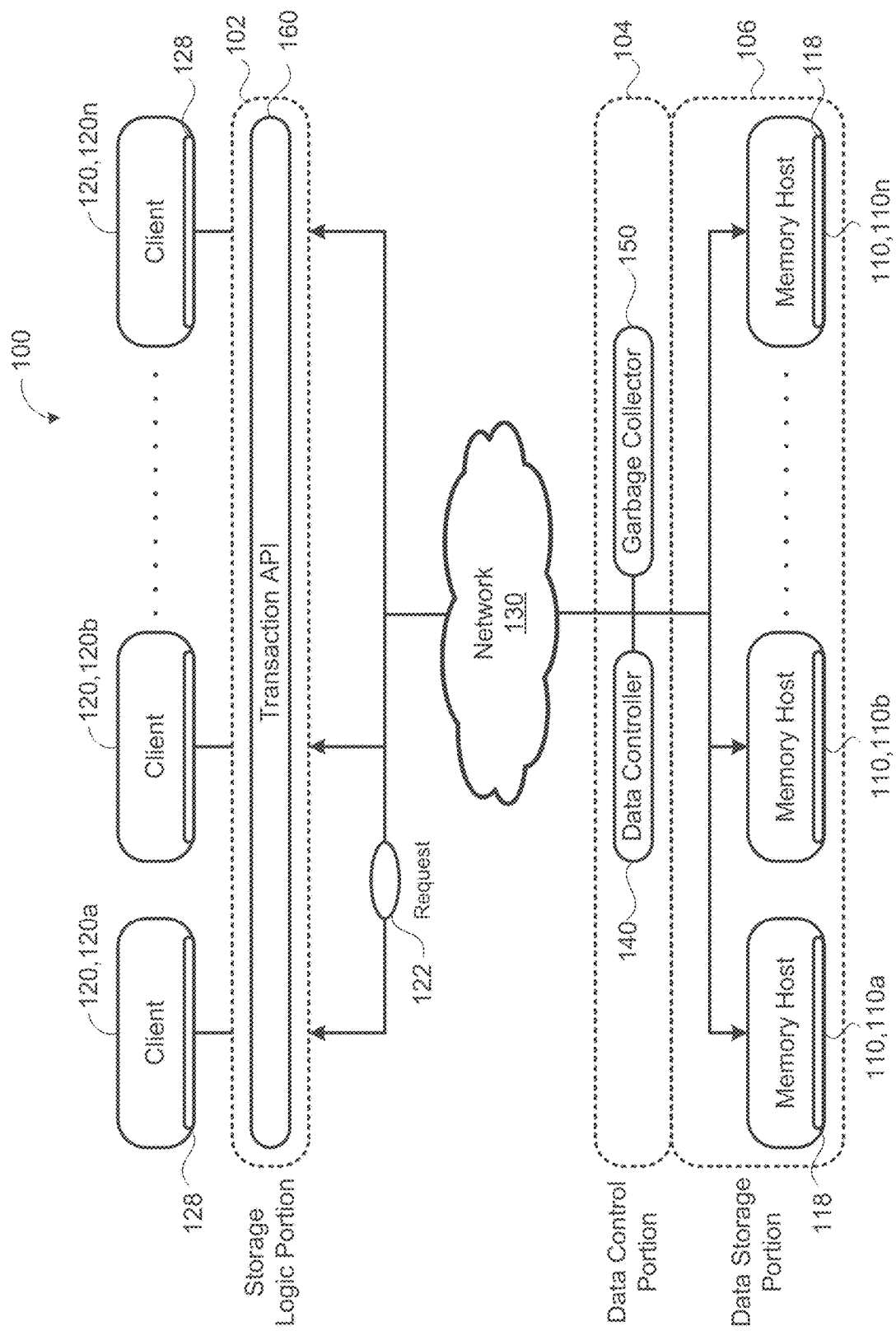
FIG. 1A is a schematic view of an exemplary distributed storage system.
Figure 1B:
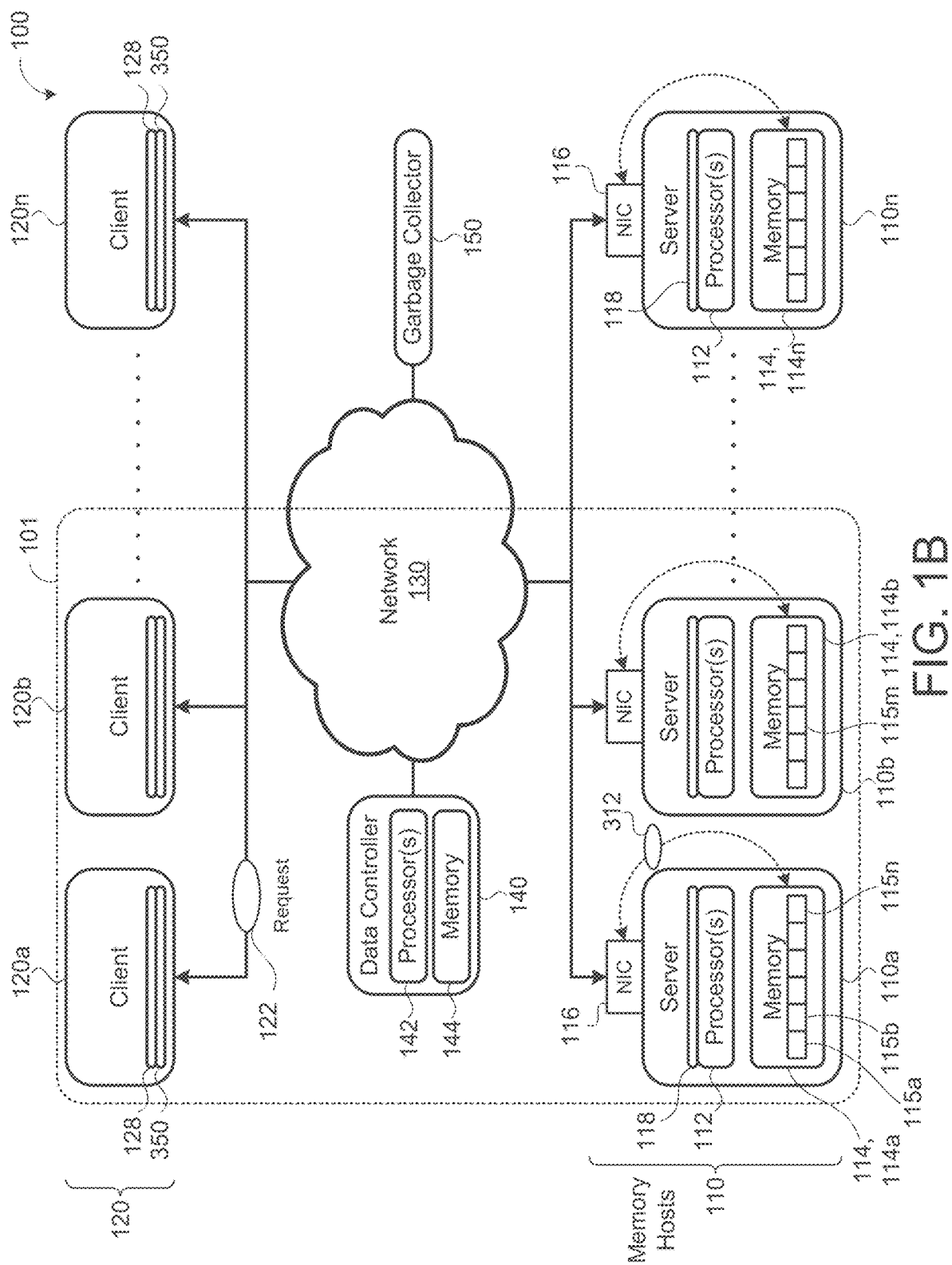
FIG. 1B is a schematic view of an exemplary distributed storage system having a cell of memory hosts managed by a data controller.

Referring to FIGS. 1A and 1B, in some implementations, a distributed storage system 100 includes loosely coupled resource hosts 110, 110a-n (e.g., computers or servers), each having a computing resource 112 (e.g., one or more processors or central processing units (CPUs)) in communication with storage resources 114 (e.g., memory, memory hardware, flash memory, dynamic random access memory (DRAM), phase change memory (PCM), and/or disks) that may be used for caching data. A storage abstraction (e.g., key/value store or file system) overlain on the storage resources 114 allows scalable use of the storage resources 114 by one or more clients 120, 120a-n. The clients 120 may communicate with the resource hosts 110 through a network 130 (e.g., via RPC).

The distributed system 100 may include multiple layers of redundancy where data 202 is replicated and stored in multiple data centers. Data centers (not shown) house computer systems and their associated components, such as telecommunications and distributed systems 100. Data centers usually include backup power supplies, redundant communications connections, environmental controls (to maintain a constant temperature), and security devices. Data centers can be large industrial scale operations that use a great amount of electricity (e.g., as much as a small town). Data 202 may be located in different geographical locations (e.g., different cities, different countries, and different continents). In some examples, the data centers, or portions thereof, requires maintenance (e.g., due to a power outage or disconnecting a portion of the system for replacing parts, or a system failure, or a combination thereof). The data 202 stored in these data centers, and in particular, the distributed system 100 may be unavailable to users/clients 120 during the maintenance period resulting in the impairment or halt of a user's operations. Therefore, it is desirable to provide a distributed system 100 capable of efficiently replicating data 202 stored on the storage resources 114 so that during maintenance and/or failure of the system 100 or portions thereof, a client 120 may still retrieve the stored data 202 (e.g., from a replicated stored data 202).

In some implementations, the distributed system 100 is "single-sided," eliminating the need for any server jobs for responding to remote procedure calls (RPC) from clients 120 to store or retrieve data 202 on their corresponding resource hosts 110 and may rely on specialized hardware to process remote requests 122 instead. "Single-sided" refers to the method by which most of the request processing on the resource hosts 110 may be done in hardware rather than by software executed on CPUs 112 of the resource hosts 110. Rather than having a processor 112 of a resource host 110 (e.g., a server) execute a server process 118 that exports access of the corresponding storage resource 114 (e.g., non-transitory memory) to client processes 128 executing on the clients 120, the clients 120 may directly access the storage resource 114 through a network interface controller (NIC) 116 of the resource host 110. In other words, a client process 128 executing on a client 120 may directly interface with one or more storage resources 114 without requiring execution of a routine of any server processes 118 executing on the computing resources 112. This single-sided distributed architecture offers relatively high-throughput and low latency, since clients 120 can access the storage resources 114 without interfacing with the computing resources 112 of the resource hosts 110. This has the effect of decoupling the requirements for storage resources 114 and CPU cycles that typical two-sided distributed systems 100 carry. The single-sided distributed system 100 can utilize remote storage resources 114 regardless of whether there are spare CPU cycles on that resource host 110; furthermore, since single-sided operations do not contend for server CPU 112 resources, a single-sided system can serve cache requests 122 with very predictable, low latency, even when resource hosts 110 are running at high CPU utilization. Thus, the single-sided distributed system 100 allows higher utilization of both cluster storage 114 and CPU 112 resources than traditional two-sided systems, while delivering predictable, low latency.

In some implementations, the distributed storage system 100 includes a storage logic portion 102, a data control portion 104, and a data storage portion 106. The storage logic portion 102 may include a transaction application programming interface (API) 350 (e.g., a single-sided transactional system client library) that is responsible for accessing the underlying data, for example, via RPC or single-sided operations. The data control portion 104 may manage allocation and access to storage resources 114 with tasks, such as allocating storage resources 114, registering storage resources 114 with the corresponding network interface controller 116, setting up connections between the client(s) 120 and the memory hosts 110, handling errors in case of machine failures, etc. The data storage portion 106 may include the loosely coupled memory hosts 110, 110a-n.

The distributed storage system 100 may store data 202 in dynamic random access memory (DRAM) 114 and serve the data 202 from the remote hosts 110 via remote direct memory access (RDMA)-capable network interface controllers 116. A network interface controller 116 (also known as a network interface card, network adapter, or LAN adapter) may be a computer hardware component that connects a computing resource 112 to the network 130. Both the memory hosts 110a-n and the client 120 may each have a network interface controller 116 for network communications. A host process 118 executing on the computing processor 112 of the memory host 110 registers a set of remote direct memory accessible regions 115a-n of the memory 114 with the network interface controller 116. The host process 118 may register the remote direct memory accessible regions 115a-n of the memory 114 with a permission of read-only or read/write.

The single-sided operations performed by the network interface controllers 116 may be limited to simple reads, writes, and compare-and-swap operations, none of which may be sophisticated enough to act as a drop-in replacement for the software logic implemented by a traditional cache server job to carry out cache requests and manage cache policies. The transaction API 350 translates commands, such as look-up or insert data commands, into sequences of primitive network interface controller operations. The transaction API 350 interfaces with the data control and data control portions 104, 106 of the distributed storage system 100.

The distributed storage system 100 may include a co-located software process to register memory 114 for remote access with the network interface controllers 116 and set up connections with client processes 128. Once the connections are set up, client processes 128 can access the registered memory 114 via engines in the hardware of the network interface controllers 116 without any involvement from software on the local CPUs 112 of the corresponding memory hosts 110.

Referring to FIG. 1B, in some implementations, the distributed storage system 100 includes multiple cells 101, each cell 101 including memory hosts 110 and a data controller 140 in communication with the memory host 110. The data controller 140 (e.g., process) may execute on a computing processor 142 (e.g., server having memory hardware 144) connected to the network 130 and manage the data storage (e.g., manage a file system stored on the memory hosts 110), control data placements, and/or initiate data recovery. Moreover, the data controller 140 may track an existence and storage location of data 202 on the memory hosts 110. Redundant data controllers 140 are possible. In some implementations, the data controller(s) 140 track the existence and/or location of multiple copies of the data 202 for redundancy and/or performance.

Figure 2:
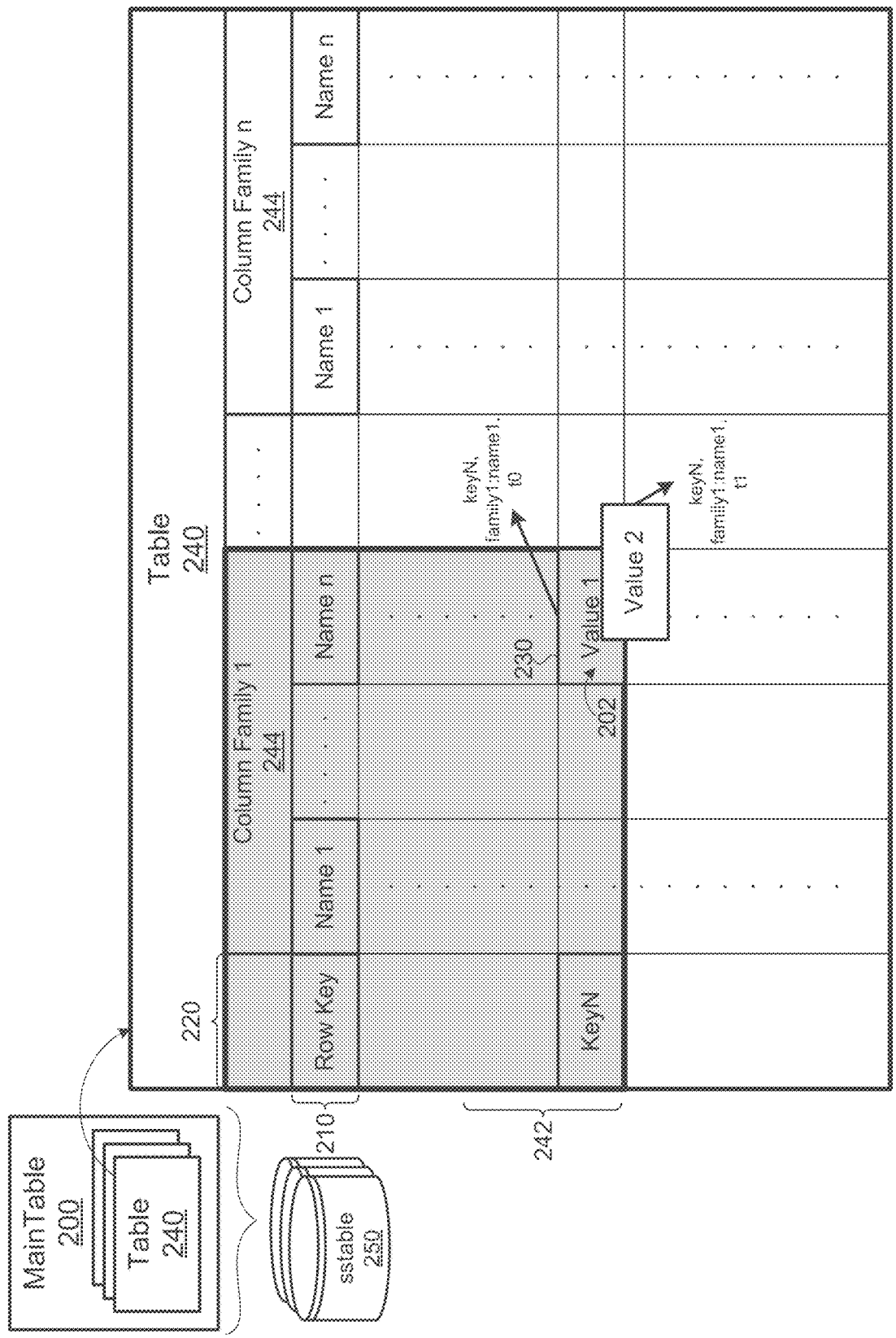
FIG. 2 is a schematic view of an exemplary database stored on the distributed storage system of FIGS. 1A and 1B.

Referring to FIG. 2, in some examples, the data 202 stored on the memory hosts 110 is organized in a database 200 that defines rows 210 and columns 220, both define cells 230. Each cell 230 stores data 202. In some implementations, each main table 200 includes at least one sub-table 240 (also referred to as table 240) that includes the rows 210, columns 220, and cells 230. In addition, each table 240 may be further divided into smaller tables 242 (e.g., tablets) that include a specific number of rows 210. In some example, each tablet 242 has a size threshold. A tablet 242 may be limited to a column family 244 (discussed below). In some examples, the distributed storage system 100 generates a stored string table (SSTable) 250, which provides the persistent, ordered immutable map from keys to values, where both keys and values are arbitrary byte strings. Each SSTable 250 contains a sequence of blocks or tablet 242. In some examples, the SSTables 250 for a locality group (e.g., a tablet 242) may be compressed. The compressed SSTable 250 may be read without decompressing the entire file. Therefore, the SSTable 250 holds and stores the data 202 of the main table 200, e.g., the tables 240, and the tablets 242.

Referring back to FIGS. 1A and 1B, in some implementations, the transaction API 160 interfaces between a client 120 (e.g., with the client process 128) and the data controller 140. In some examples, the client 120 communicates with the data controller 140 through one or more remote procedure calls (RPC). In response to a client request 122, the transaction API 160 may find the storage location of certain data 202 and accesses the data 202. The transaction API 160 communicates directly with the appropriate memory hosts 110 (via the network interface controllers 116) to read or write the data 202 (e.g., using remote direct memory access). In the case that a memory host 110 is non-operational, or the data 202 was moved to a different memory host 110, the client request 122 fails, prompting the client 120 to re-query the data controller 140.

The storage system 100 or portions thereof may undergo a system failure for a period of time. The data 202 distributed on the memory hosts 110 of the storage system 100 may not be available to the clients 120. For example, a memory host 110a may be undergoing maintenance or has a system failure, therefore, data 202 stored on the memory host 110a may not be retrieved. In addition, the memory host 110a may take an extended period of time (e.g., a week) to be functional or for maintenance to be completed. Within the period during which the memory host 110a is not available, the storage system 100 may retrieve the data 202 from other available memory hosts 110, therefore, it may be important for the distributed storage system 100 to replicate the data 202 and store the replicas on at least another memory hosts 110. The redundancy of the data 202 allows the client 120 to retrieve data 202 from the distributed storage system 100 even when one of the memory hosts 110 storing the data 202 is unavailable.

In some implementations, the distributed storage system 100 aims to store data 202 reliably so that if one or more hosts 110 fail, the data 202 may be recovered and accessible from one or more other hosts 110. Replication of the data 202 (i.e., data replicas) allows for such reliability. For example, data modification (also referred to as "mutation") to the distributed storage system 100 may be replicated as one or more replicas and stored in the same memory host 110 or another memory host 110. Therefore, data 202 may only be lost when all data replicas of the experience unrecoverable failures.

Referring back to FIG. 2, in some examples, the distributed storage system 100 includes the main table 200 that stores the data 202 or replicated data 202 in one or more tables 240. The main table 200 provides a three-dimensional mapping. The distributed storage system 100 maps each table 240 into two arbitrary string values, e.g., row key and column key, and timestamp into an associated arbitrary byte array. For example, the table 240 may be indexed as (row: string, column:string, time:int64) string. Each table 240 may be further divided into tablets 242 that include a defined number of rows 210 and/or columns 220, or a predetermined size. In some examples, each tablet 242 is a collection of related data 202 held in a structured format within the main table 200.

In some implementations, the row identifiers or keys associated with each row 210 of a table 240 is an arbitrary string. Each row key is different and identifies a respective row 210. Every read or write of data 202 under a single row key is atomic, regardless of the number of columns 220 being read or written in the row 210. Column keys or columns 220 are grouped into sets called "column families" 244, which form the basic unit of access control. In some examples, the data 202 stored in a column family 244 is usually the same type; in addition, the distributed storage system 100 must create the column family 244 before storing data 202 in the column family 244. In some examples, once the distributed storage system 100 creates the column family 244, any column key of the created family 244 may be used. In some examples, the distributed storage system 100 may further split each table 240 into multiple tablets 242, where each tablet 242 defines a row range and a column range (e.g., one or more column families). Each tablet 242 may be a segment of the table split along a row chosen so that the tablet is within a threshold size, e.g., 200 megabytes. In some example, each cell 230 within the main table 200 of the distributed storage system 100 may store multiple versions of the same data 202. The distributed storage system 100, i.e., data controller 140, distributes the tablets 242 on the hosts 110. Each cell 230 in the table 240 may contain multiple versions of the same data 202. These versions are indexed by timestamp. For example, as shown in FIG. 2, the same cell 230 may include different versions of the same data 202, each version taken or stored at a different timestamp. As shown, the data 202 of a cell has two versions, a first versions Value 1 identified as "KeyN, family1:name1, t=0" and a second version Value 2 identified as "KeyN, family1:name1, t=1." The distributed storage system 100 may assign the time of each cell 230, for example in a 64-bit integer format. Moreover, the timestamp may be a current time.

Referring also to FIGS. 1A and 1B, in some implementations, the distributed storage system 100 includes a garbage collector 150. The garbage collector 150 attempts to reclaim garbage, i.e., data 202 that is no longer used by the distributed storage system 100 or data that is expired. In some examples, the garbage collector 150 collects data 202 of cells 230 associated with a timestamp within a threshold period of time or a threshold number of versions (keep last 3 versions). The garbage collector 150 may be a form of memory management because it collects stored data 202 that is either no longer needed or expired. The garbage collector 150 finds data objects or data 202 within the main table 200 that is no longer accessed by the client and reclaims the resources (e.g., memory or cell 230) used by the data 202. The garbage collector 150 automatically collects unused data 202 without having a client indicate which data cells 240 to collect data 202 from. The garbage collector 150 follows predefined parameters and applies them to the data 202 stored in each data cell 240 to determine if the data should be collected by the garbage collector 150.

In some implementations, the distributed storage system 100 receives data 202 from one or more clients 120 and stores the data 202 on the memory hosts 110. As previously discussed, the data 202 is organized in the main table 200 that include tables 240 and tablets 242. The distributed storage system 100 generates replicated data 202 of the organized data 202. In some example, the distributed storage system 100 generates a first replica of a main table 200 and then generates another replica of the first replicated main table 200. Replicating a main table 200 is time consuming due to the size of the main table 200 (e.g., distributed storage system 100). Often times, clients 120 face situations where replicas are needed faster than usual. These situations include, for example, handling increased traffic from clients 120 trying to reach the data 202. In such an example, creating one or more replicas of the data 202 or main table 200 allows for the distribution of the workload. Different clients 120 may access different replicas of the main stored data 202 preventing all the clients from accessing the data 202 from one main table 200 and instead allowing the clients 120 to access multiple tables 200 being a replication of one another. Thus, distributing the workload among the replicated data 202 or tables 200. Another situation is to provide improved read/write performance. For example, a client 120 located in the USA may access data 202 stored on one or more memory hosts 110 located in the USA faster than accessing the data 202 stored on one or more memory hosts 110 located in Asia. Therefore, the data 202 may have a replica stored on one or more memory hosts 110 located in the USA, and another replica stored on one or more memory hosts 110 located in Asia. This allows for a user in the USA to access the replicated data 202 stored on the one or more memory hosts 110 located in the USA, and another client 120 located in Asia to access the same replicated data 202 on the one or more memory hosts 110 located in Asia. This reduces latency for the client(s) 120 in each region. Another situation may arise when the client 120 migrates stored data 202 from one data center to another, for example, when the one data center is either being shut down or experiencing problems (e.g., maintenance, upgrades, or being shut down).

A common approach to creating a new replica of data 202 stored in a main table 200 allows the distributed storage system 100 to extract the data 202 of each cell 230 within the main table 200 and replicate the data 202 of each cell 230 individually storing it into a destination cell 230 (located in a different main table 200). This process is time consuming, especially for databases that range from a few dozen terabytes to many petabytes in size, and may take days or weeks to be replicated. In addition, the process consumes computing resources, such as computing power and memory capacity for reading the data 202 from the source cell 230 and writing the data 202 to the destination cell 230. Moreover, this process may lead to data replication inconsistencies because updated data 202 in the source main table 200 may not be replicated. Therefore, it is desirable to provide a distributed system 100 capable of creating new replicas quickly, efficiently, and seamlessly. The distributed storage system 100 generates the data replication faster (e.g., five times or more) by replicating the SSTables 250 (e.g., compressed or uncompressed) instead of replicating each individual cell 230. It is also desirable to provide a distributed system 100 that uses less computing resources (e.g., resource hosts 110, the processors 112, storage resources 114) and incurs little load on the source and target data centers because it avoids reading and writing data 202 from a source cell 230 to a destination cell 230. It is also desirable that the distributed system 100 provides data consistency of the new replicated data 202. It is also desirable to provide a distributed system 100 that efficiently using the resource hosts 110, the processors 112, storage resources 114, and the network resources of the system 100 during maintenance and/or failure of the system 100 or portions thereof, by efficiently creating replicas of the data 202 so when one of the resources 110, 112, 114 fails, the data 202 may be retrieved from another resource 110, 112, 114 because it has been replicated by the system 100.

Referring to FIGS. 3A-3G, the distributed system 100 decreases the time to create a new replica of the data 202 by copying the SSTable(s) 250 and then restoring the main table 200 (a replication of the main table 200) or a table 240 from the copied SSTable 250 to the new main table 200 or table 240. The distributed system 100 pins table logs 302 within a replication configuration file 300 to prevent the garbage collector 150 from deleting the pinned data 202 or table (e.g., the temporary table 260), which allows the newly written data or mutation that is not captured in the SSTables 250 at the time the replication of the SSTable 250 began, to be incorporated in the replicated data 202. Rather than having a distributed system extract data 202 from individual cells 230 of the SSTable files 250 and then write the extracted data 202 to the new SSTable files 250, where the target main table 200 stored its data 202, copying the SSTable 250 as a whole instead of the individual data 202 stored in the SSTable 250 results in several advantages. For example, network protocols are usually designed to be optimized when transferring large chunks of data. Thus, copying the SSTable files 250 instead of the data 202 stored in the SSTable 250 takes advantage of optimized protocol data transfer, since the SSTable file 250 is a large file compared to the summation of the individual data 202 of the SSTable 250. The SSTable file 250 may be tens or hundreds of megabytes in size, causing the data transfer rate to be several times better then copying the individual data 202 stored in the SSTable file 250. In addition, SSTable file 250 may be compressed, making the SSTable file 250 smaller than the total size of the data 202 stored in the SSTable file 250, which further shortens the time that the distributed storage system 100 needs to generate a replica of the data 202. Another advantage of the distributed storage system 100 is that it creates the new replica seamlessly with consistency. A challenging issue when creating a replica of stored data 202 arises when a system is copying the data and new mutations to the original data are occurring, i.e., the data being copied is being changed. The distributed storage system 100 has to ensure that the updates are also reflected or updated in the replicated data 202. As shown in the figures, the distributed storage system 100 generates a temporary table 260 that is pinned in the replication configuration file 300, and prevents the garbage collector 150 from collecting the replication log 252 associated with a table 240 being replicated. A replication log 252 is a log file associated with each replicated table 240 or main table 200 that contains mutations applied on the replicated table 240 or main table 200. The temporary table 260 prevents garbage collection of recent mutations so that they will be available for the new replica to pull at a later time. Once the new replica is created and comes online, it has all the mutations that are present in the SSTables 250 and starts pulling those that are pinned by the temporary table 260.

Figure 3A:
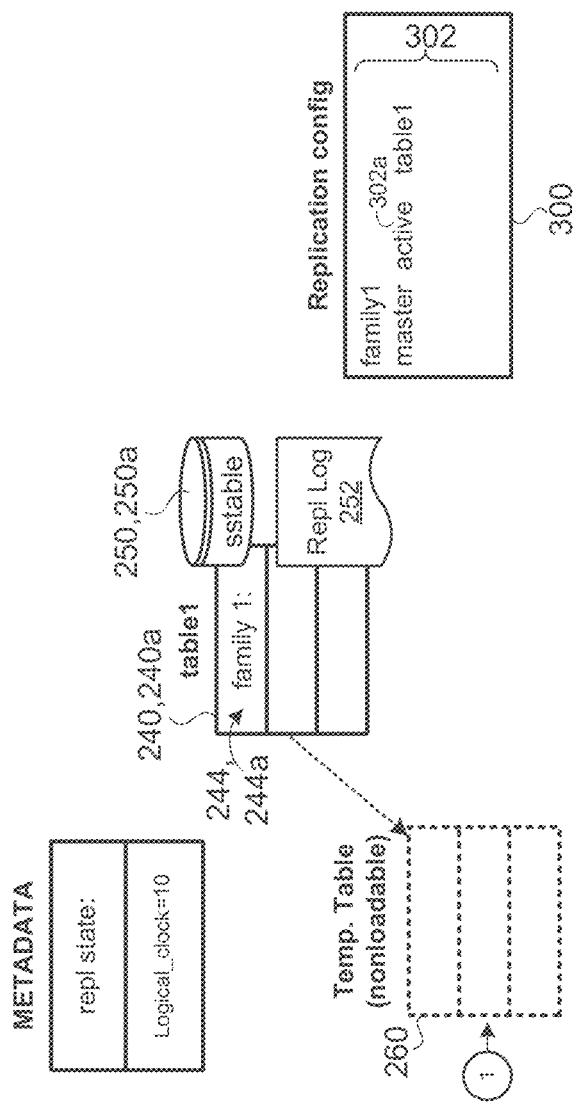
FIGS. 3A-3G are schematic views of an exemplary process of replicating a table of the database of FIG. 2.

Referring to FIG. 3A, in some implementations, a first table 240a (e.g., "table1") is an existing replication of a table 240 in a replication group defined by a replication configuration file 300. The first table 240a is stored on one or more memory host 110. The replication configuration file 300 is a global file of the distributed storage system 100 that describes a set of replicas associated with each replicated column family 244. As shown, the first table 240a includes only one replicated column family 244a; however, the first table 240 may include more than one replicated column families 244. For each replicated column family 244 in the first table 240a, the replication configuration file 300 includes a replicated family log, "family 1." Since the first table 240a includes only one replicated column family 244a, the shown replication configuration file 300 includes a replication log entry 302a of the first family 240a. The replication log entry 302a, as shown, includes a field that indicates a role that may either be a master or a slave, the status, and the table name (e.g., "table 1").

In some implementations, the distributed storage system 100 creates a temporary table 260 (e.g., unloaded with any data). The temporary table 260 causes creation of a replication log entry 302b (FIG. 3B) in the replication configuration file 300 that pins the replication logs 252 of the incoming mutations from a replication time onward, so that the garbage collector 150 does not collect the replication logs 252 before the temporary table 260 can processes those replication logs 252. When all the replications have updated their data, the garbage collector 150 may collect the replication logs 252. The distributed storage system 100 generates the temporary table 260 with a "nonloadable" state set for pinning the replication logs 252. The temporary table 260 prevents the hosts 110 from loading the temporary table 260, which prevents the temporary table 260 from pulling data from other replicas (i.e., replicas different than table 244a). In turn, this prevents other replicas from recycling their replication logs, since the temporary table 260 has not pulled data yet. As a result, all replication logs 252 are pinned. The temporary table 260 acts as a replicated table waiting to pull data from the replication logs 252.

Figure 3B:
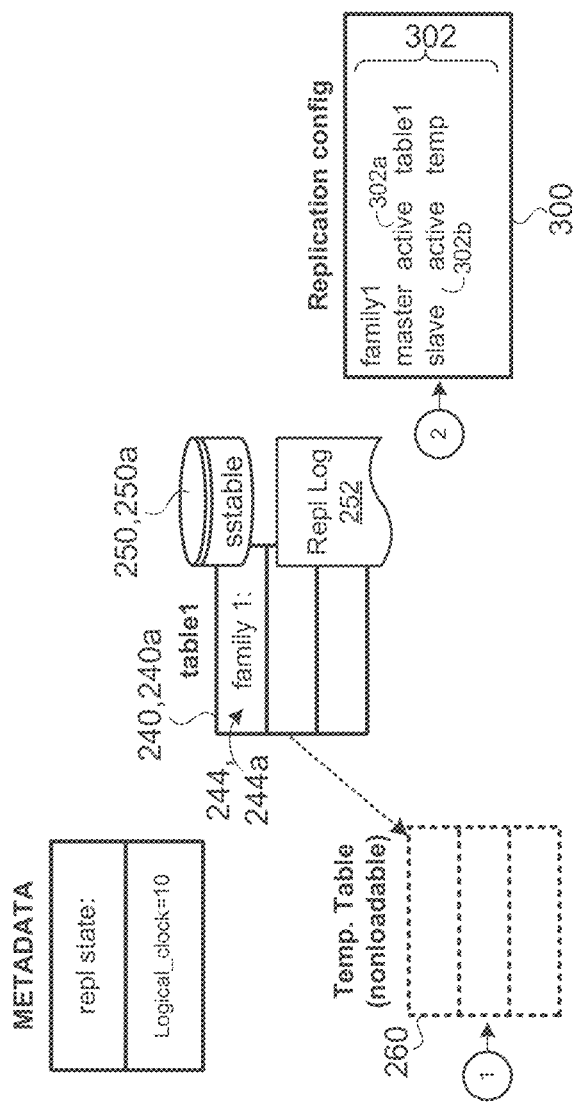

Referring to FIG. 3B, the distributed storage system 100 adds an entry 302b for the temporary table 250 under family 1 of the replication configuration file 300. The entry log 302b for the temporary table 260 is entered as "slave active, temp." meaning that the temporary table 260 has a slave role, is currently active, and is named "temp" Once the temp table 260 has a log entry 302b in the replication configuration file 300, all replication logs 252 associated with any replicas, are pinned from the moment the log entry 302b is entered.

Figure 3C:
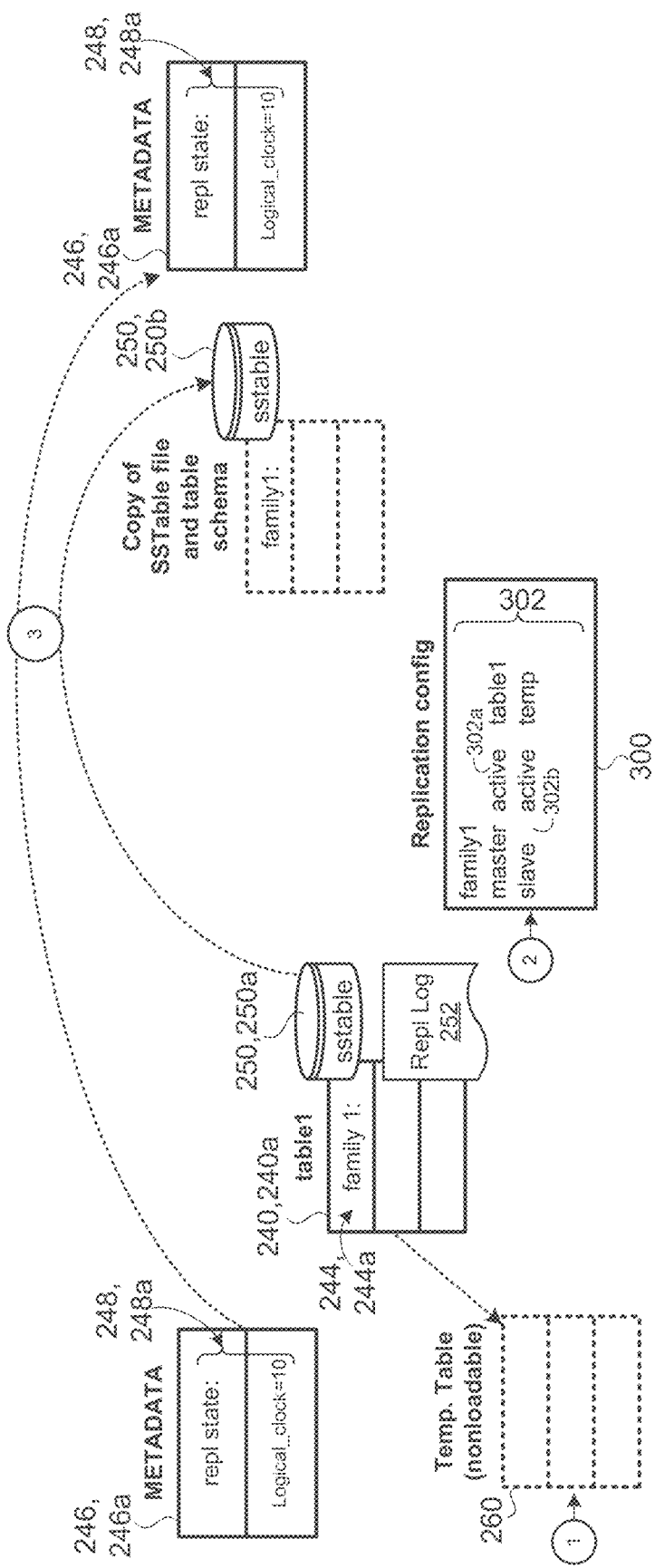

Referring to FIG. 3C, the distributed storage system 100 copies the SSTable files 250, tablet metadata 246, and replication state 243. The tablet metadata 246 includes metadata relating to the tablet 242 that includes the column family 244. The replication state 248 is indicative of the time that the replication was created. The replication state 248 includes a "logical_clock," which indicates the most recent time for which all mutations have been pulled from a source replica. In the example shown, "table1" is the only master replica and has all the mutations, so the source replica for "table1" is itself and the "logical_clock" is the current time, assuming the logical clock for the current time is 10. Moreover, in this case, the distributed storage system 100 creates a new replica "table 2" 240b based on table1 240a, so the SSTable files 250a of table 1 240a are copied to the target memory host 114 along with the associated metadata 246a and replication states 248a. The distributed storage system 100 will use the copied SSTable files 250b, the copied metadata 246b, and the copied replication state 248b to generate the replicated table 240b, "table2."

Figure 3D:
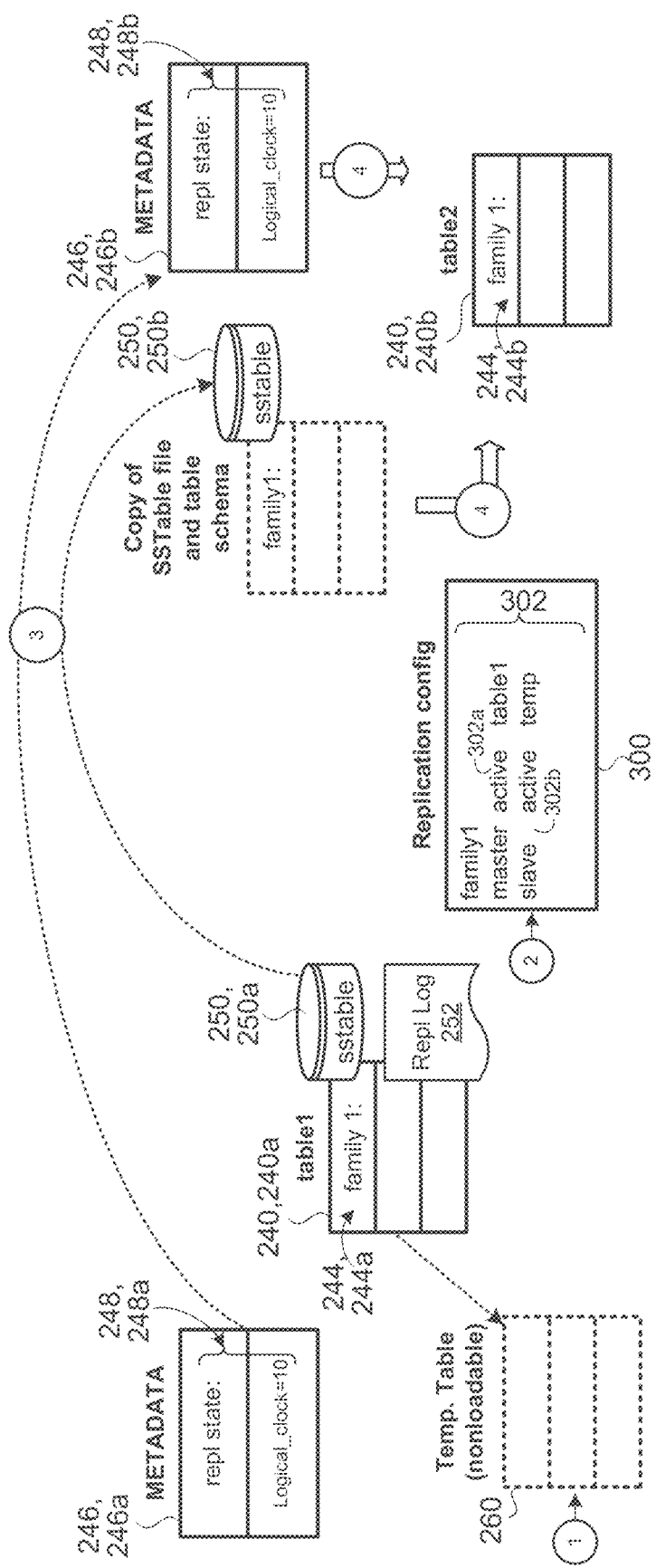

Referring to FIG. 3D, the distributed storage system 100 generates the new replicated table 240b, i.e., the second table 240b "table2" based on the copied SSTable files 250b, the copied metadata 246b, and the copied replication state 248b. Once the second table 240b is generated, the second table 240b becomes a replica of table 1 240a as of the time indicated in the replication state 248a, 248b, which is different than a current state of the first table 240a the distributed storage system 100 may have applied mutations to the first table 240a since the time indicated in the replication state 248a.

Figure 3E:
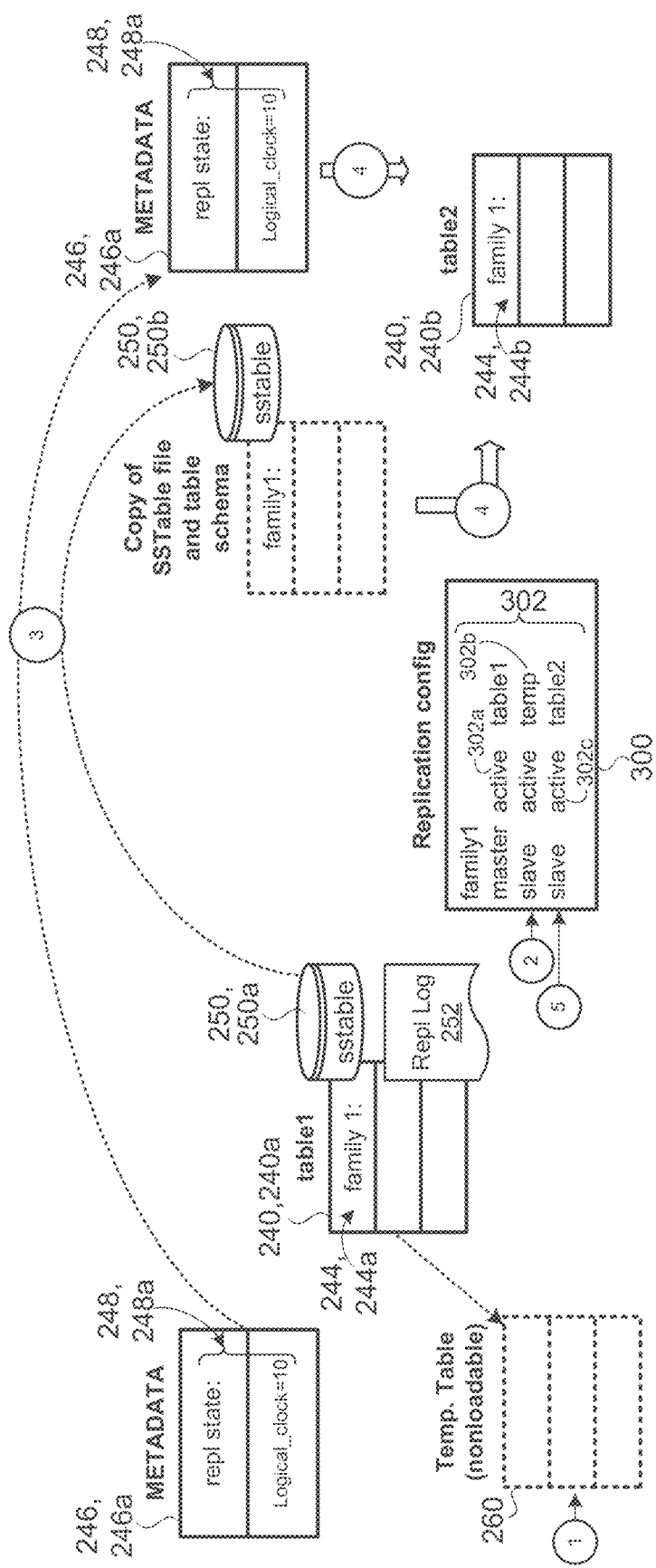

Referring to FIG. 3E, the distributed storage system 100 adds a replication log 302 in the replication configuration file 300 to indicate that the second table 240b is part of the replication group of family 1 244a. The entry log 302 for the second table 240b is entered as "slave, active, table 1" meaning that the second table 240b has a slave role, is currently active, and is named "table2".

Figure 3F:
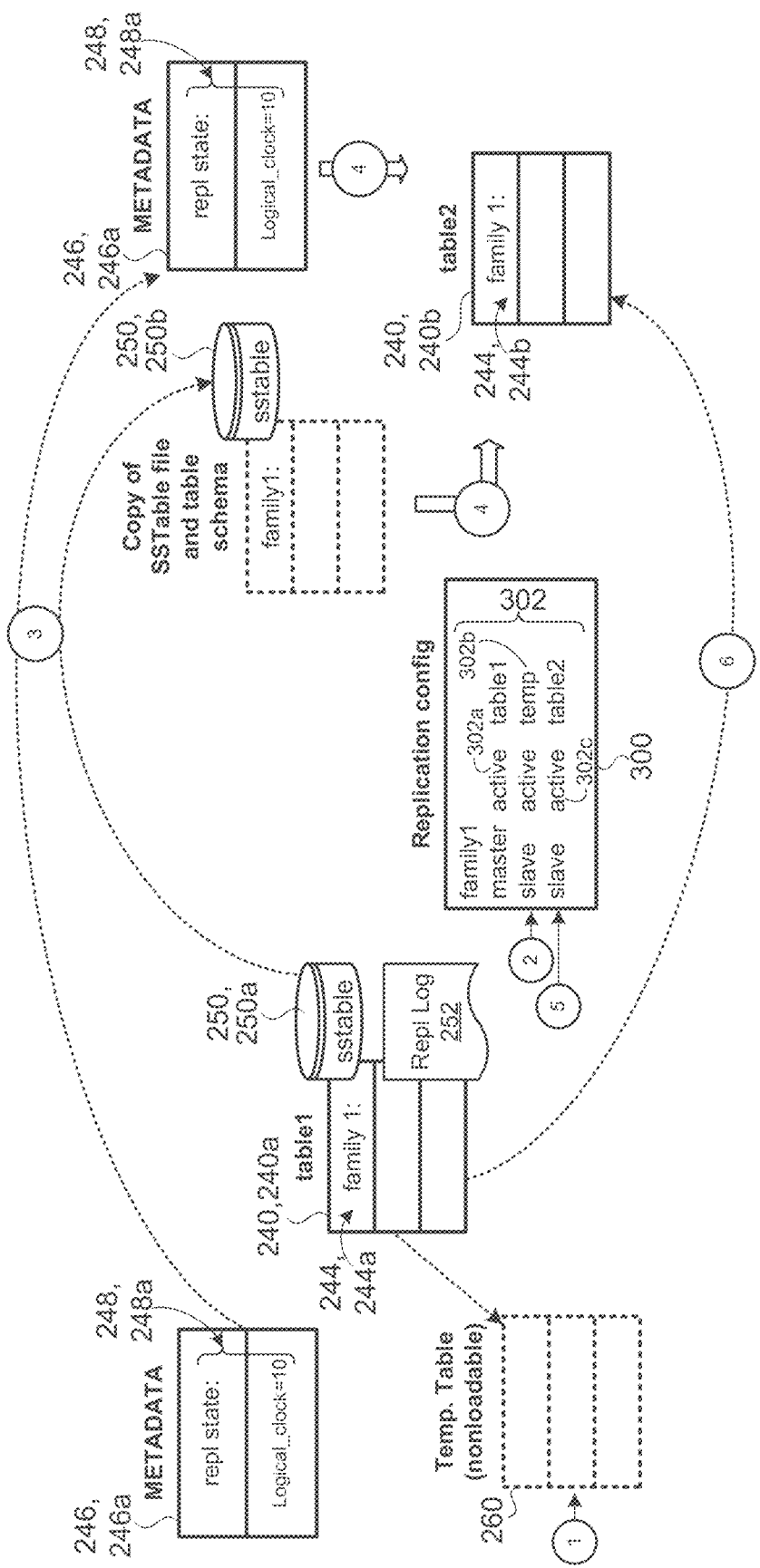

Referring to FIG. 3F, the distributed storage system 100 sends queries to other table replicas 240 to determine if any recent mutations have occurred since the time indicated by the replication state 248b copied from the replication state 248a of the first table 240a. Since the replication is mirrored from the first table 240a to the second table 240b, all mutations received prior to time indicated by the replication state 248b (e.g., "logical_clock" 10) are already copied over to the second table 240b by way of the replicated SSTable files 250b. Recent mutations applied on the first table 240 have "logical_clock" greater than the time indicated by the replication state 248b (in the example, "logical_clock" 10) and are pinned by the temporary table 260, as shown in FIG. 3A. So, in the example, the second table 240b starts pulling from the "logical_clock" time of 10, which covers proper time ranges for all of its missing mutations. As shown, the first table 240a is the only replica; however, in some instances, more than one replicated table exists 240 and the second table 240b retrieves any update mutations from more than one table 240 after the time indicated in the replication state 248b (e.g., "logical_clock" 10).

Figure 3G:
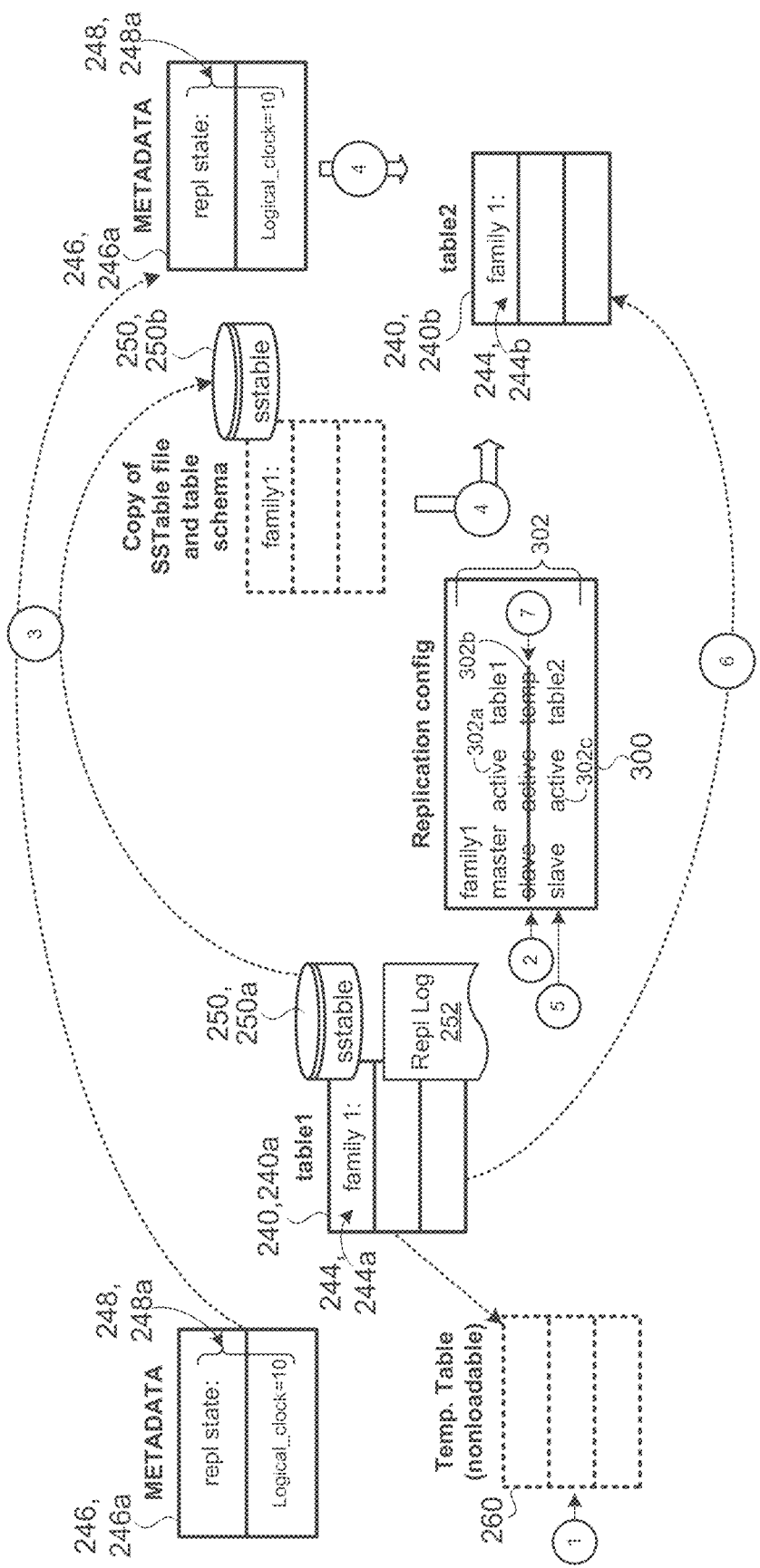

Referring to FIG. 3G, once the second table 240b is updated with all the mutations that occurred after the replication state 248b (e.g., "logical_clock" 10), the distributed storage system 100 no longer needs the temporary table 260 in the replication configuration file 300 and deletes the temporary table 260 or its association (in the replication group) in the replication configuration file 300. Once deleted, the garbage collector 150 can delete the replication log files 252 pinned by the temporary table 260.

Figure 4:
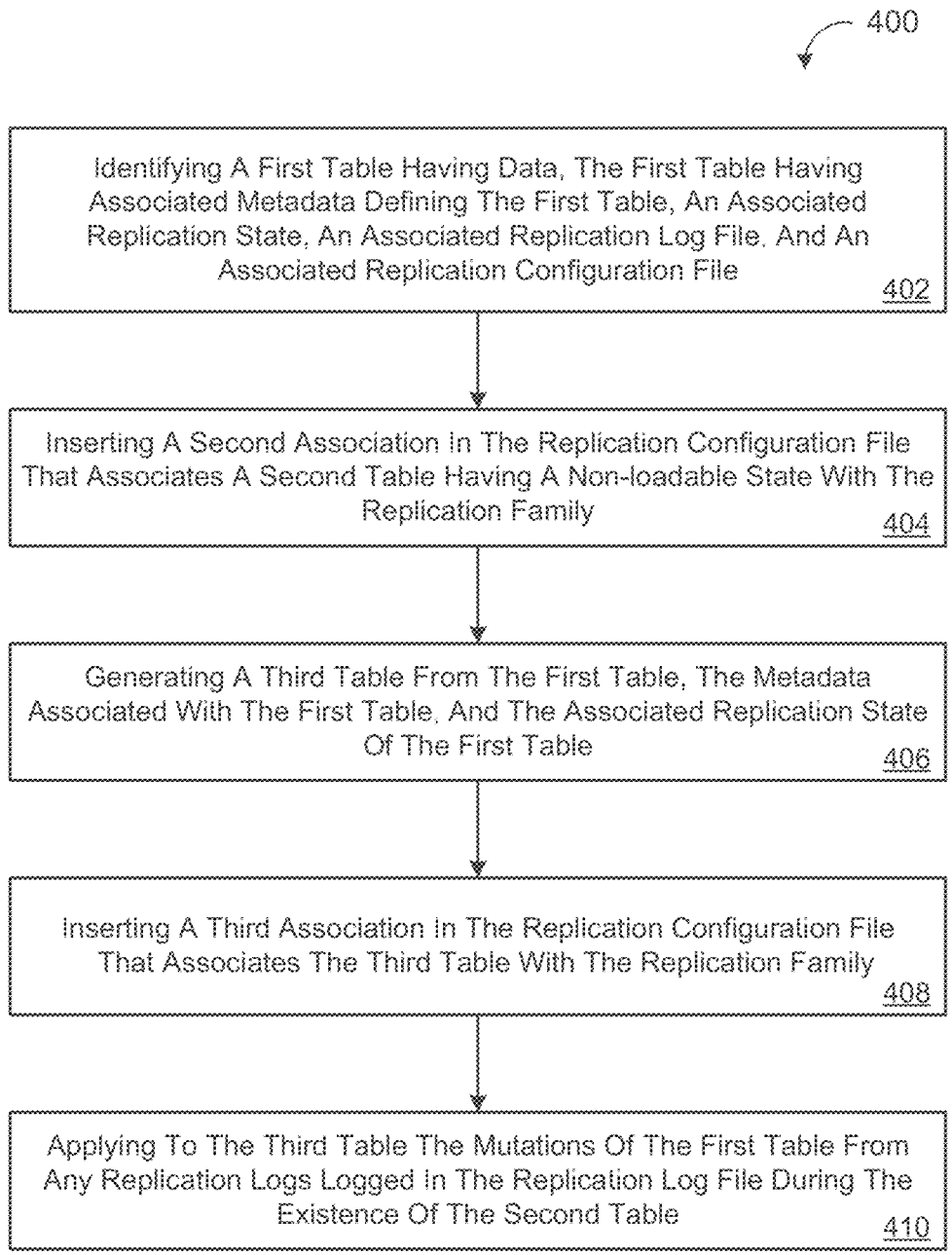
FIG. 4 is a schematic view illustrating an example for efficient data replication.

FIG. 4 illustrates a method 400 for efficient data replication. At block 402, the method 400 includes identifying a first table 240a including data, by data processing hardware (e.g., a distributed storage system 100 or a data controller 140). The first table 240a has associated metadata 246 defining the first table 240a, an associated replication state 248, an associated replication log file 252 including replication logs logging mutations of the first table 240a, and an associated replication configuration file 300 including a first association 302a that associates the first table 240a with a replication family. At block 404, the method 400 also includes inserting a second association 302b in the replication configuration file 300 that associates a second table 260 having a non-loadable state with the replication family. The association of the second table 260 with the replication family causes persistence of any replication logs 302 in the replication log file 252 that correspond to any mutations of the first table 240a during the existence of the second table 260. At block 406, the method 400 further includes generating a third table 240b from the first table 240a, the metadata associated with the first table 240a, and the associated replication state of the first table 240a. At block 408, the method 400 includes inserting a third association 302c in the replication configuration file 300 that associates the third table 240b with the replication family. At block 410, the method 400 further includes applying to the third table 240b the mutations of the first table 240a from any replication logs 302 logged in the replication log file 252 during the existence of the second table 260b.

In some implementations, the method 400 includes removing the second association 302b from the replication configuration file 300. The removal of the second association 302b removes the persistence of any replication logs 302 in the replication log file 252 that correspond to any mutations of the first table 240a during the existence of the second table 260. In other words, the removal of the second association 302b allows for the deletion of any replication logs 302 in the replication log file 252 that correspond to any mutations of the first table 240a during the existence of the second table 260. The method 400 further includes generating the second table 260 with the non-loadable state before inserting the second association 302b in the replication configuration file 300 and deleting the second table 260 after removing the second association 302b from the replication configuration file 300.

In some examples, applying to the third table 240b the mutations of the first table 240a of any replication logs 302 logged in the replication log file 252 during the existence of the second table 260 includes, before removing the second association 302b from the replication configuration file 300, identifying, as transient mutations, any mutations to the first table 240a logged in the associated replication log file 252 that occurred after generating the second table 260 and inserting the second association 302b in the replication configuration file 300 and before a completion of generating the third table 240b Applying to the third table 240b the mutations of the first table 240a of any replication logs 302 further includes applying the transient mutations to the third table 240b. The replication configuration file 300 may include replication logs 302 for mutations to all tables 240 associated with the replication family. The method 400 may further include applying to the third table 240b the mutations of replication logs 252 logged for each table 240 in the replication log file 252 during the existence of the second table 260. The associated replication state 248a of the first table 240a may include a logical clock 248a indicating a most recent time when all mutations of a source table were applied to the first table 240a, the first table 240a being a replication of the source table.

Additionally or alternatively, generating the third table 240b may include copying a sorted string table file 250a representing the first table 240a, copying a metadata file 246a including the metadata associated with the first table 240a, copying a replication state file including the first table replication state and storing in memory hardware in communication with the data processing hardware, the copied sorted string table, the copied metadata file, and the copied replication state file. The sorted string table 250a may include a map from keys to values of the first database table. The keys and values may be arbitrary byte strings. The keys may represent a row 210 and a column 220. The value represents data stored in a cell 230 defined by the row 210 and the column 220. The non-loadable state of the second table 240b may prevent loading data into the second table 240b and processing replication logs of any tables 240 associated with the replication family in the replication configuration file 300.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to low speed bus 570 and storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks, and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
    identifying, by data processing hardware, a first replica table comprising table data, the first replica table having associated metadata defining the first replica table and an associated replication log file comprising logs logging mutations of the first replica table;
    generating, by the data processing hardware, a temporary table configured in a non-loadable state, the temporary table not loaded with any data, the non-loadable state preventing any data from loading into the temporary table and preventing garbage collection of any replication logs in the replication log file that correspond to any mutations of the first replica table occurring during an existence of the temporary table;
    during the existence of the temporary table:
        obtaining, at the data processing hardware, subsequent mutations of the first replica table, the subsequent mutations of the first replica table occurring during the existence of the temporary table; and
        based on the existence of the temporary table, persisting, by the data processing hardware, any replication logs in the replication log file that correspond to the subsequent mutations of the first replica table;
    generating, by the data processing hardware, a second replica table from the first replica table and the metadata associated with the first replica table, the second replica table not including the subsequent mutations of the first replica table; and
    applying, by the data processing hardware, to the second replica table, the subsequent mutations of the first replica table from the persisted replication logs.

2. The method of claim 1, wherein generating the temporary table comprises generating a temporary association between the first replica table and the temporary table.

3. The method of claim 2, further comprising removing, by the data processing hardware, the temporary association between the first replica table and the temporary table, the removal of the temporary association removing the persisted replication logs.

4. The method of claim 2, further comprising deleting, by the data processing hardware, the temporary table after removing the temporary association between the first replica table and the temporary table.

5. The method of claim 2, wherein applying, to the second replica table, the subsequent mutations of the first replica table from the persisted replication logs comprises, before removing the temporary association:
    identifying, as transient mutations, any mutations to the first replica table logged in the replication log file that occurred:
        after generating the temporary table and the temporary association, and
        before a completion of generating the second replica table; and
    applying the transient mutations to the second replica table.

6. The method of claim 1, wherein the first replica table comprises a replication configuration file comprising replication logs for mutations to all tables associated with the first replica table.

7. The method of claim 1, further comprising applying, by the data processing hardware, to the second replica table, the mutations of replication logs logged for each table in the replication log file during the existence of the temporary table.

8. The method of claim 1, wherein the first replica table has an associated replication state comprising a logical clock indicating a most recent time when all mutations of a source replica table were applied to the first replica table, the first replica table being a replication of the source replica table.

9. The method of claim 8, wherein generating the second replica table comprises:
copying a sorted string table file representing the first replica table;
copying a metadata file comprising the metadata associated with the first replica table;
copying a replication state file comprising a replication state of the first replica table; and
storing in memory hardware in communication with the data processing hardware, the copied sorted string table file, the copied metadata file, and the copied replication state file.

10. The method of claim 1, wherein the non-loadable state of the temporary table further prevents garbage collection of any replication logs of any replica tables associated with the first replica table occurring during the existence of the temporary table.

11. A system comprising:
data processing hardware; and
memory hardware in communication with the data processing hardware, the memory hardware storing instructions that when executed on the data processing hardware cause the data processing hardware to perform operations comprising:
identifying a first replica table comprising table data, the first replica table having associated metadata defining the first replica table and an associated replication log file comprising logs logging mutations of the first replica table;
generating a temporary table configured in a non-loadable state, the temporary table not loaded with any data, the non-loadable state preventing any data from loading into the temporary table and preventing garbage collection of any replication logs in the replication log file that correspond to any mutations of the first replica table occurring during an existence of the temporary table;
during the existence of the temporary table:
obtaining, at the data processing hardware, subsequent mutations of the first replica table, the subsequent mutations of the first replica table occurring during the existence of the temporary table; and
based on the existence of the temporary table, persisting any replication logs in the replication log file that correspond to the subsequent mutations of the first replica table;
generating a second replica table from the first replica table and the metadata associated with the first replica table, the second replica table not including the subsequent mutations of the first replica table; and
applying to the second replica table, the subsequent mutations of the first replica table from the persisted replication logs.

12. The system of claim 11, wherein generating the temporary table comprises generating a temporary association between the first replica table and the temporary table.

13. The system of claim 12, wherein the operations further comprise removing the temporary association between the first replica table and the temporary table, the removal of the temporary association removing the persisted replication logs.

14. The system of claim 12, wherein the operations further comprise deleting the temporary table after removing the temporary association between the first replica table and the temporary table.

15. The system of claim 12, wherein applying, to the second replica table, the subsequent mutations of the first replica table from the persisted replication logs comprises, before removing the temporary association:
identifying, as transient mutations, any mutations to the first replica table logged in the replication log file that occurred:
after generating the temporary table and the temporary association, and
before a completion of generating the second replica table; and
applying the transient mutations to the second replica table.

16. The system of claim 11, wherein the first replica table comprises a replication configuration file comprising replication logs for mutations to all tables associated with the first replica table.

17. The system of claim 11, wherein the operations further comprise applying, to the second replica table, the mutations of replication logs logged for each table in the replication log file during the existence of the temporary table.

18. The system of claim 11, wherein the first replica table has an associated replication state comprising a logical clock indicating a most recent time when all mutations of a source replica table were applied to the first replica table, the first replica table being a replication of the source replica table.

19. The system of claim 18, wherein generating the second replica table comprises:
copying a sorted string table file representing the first replica table;
copying a metadata file comprising the metadata associated with the first replica table;
copying a replication state file comprising a replication state of the first replica table; and
storing in memory hardware in communication with the data processing hardware, the copied sorted string table file, the copied metadata file, and the copied replication state file.

20. The system of claim 11, wherein the non-loadable state of the temporary table further prevents garbage collection of any replication logs of any replica tables associated with the first replica table occurring during the existence of the temporary table.

* * * * *